United States Patent Office 3,297,671
Patented Jan. 10, 1967

3,297,671
STEREOSPECIFIC POLYMERIZATION OF VINYL ETHERS
Giulio Natta, Giorgio Mazzanti, and Gino Dall'Asta, Milan, Italy, assignors to Montecatini Società Generale per l'Industria Mineraria e Chimica, Milan, Italy, a corporation of Italy
No Drawing. Filed July 31, 1961, Ser. No. 127,860
Claims priority, application Italy, Aug. 3, 1960, 13,837/60
11 Claims. (Cl. 260—91.1)

The present invention relates to a process for the stereospecific polymerization of vinyl ethers with the aid of catalysts of the cationic type.

Processes for preparing crystalline linear high polymers of vinyl ethers by polymerization of the monomer in the presence of suitable catalytic systems are known. One of the catalytic systems consists of organo-metallic complexes of the formula:

in which $R_1$ and $R_2$ are alkyl groups or hydrogen atoms.

Another known catalytic system capable of promoting the polymerization of vinyl ethers consists of compounds of the modified Friedel-Crafts type, comprising partially halogenated compounds of polyvalent metals such as aluminium, tetravalent titanium, tetravalent tin, tetra-and pentavalent vanadium, trivalent chromium and iron. In these partially halogenated compounds the primary valences of the central metal atom are saturated only in part by halogen atoms, while the other valences are also bound, with carbon bonds, to organic groups.

The presence of organic groups in the molecules of the catalyst compounds causes a decrease in cationic catalytic activity, decrease with respect to that of high valence halides of the same metal (wherein no organic groups are present).

For instance, by using diethyl aluminium monochloride or ethyl aluminium dichloride under suitable conditions it is possible to obtain a highly stereospecific polymerization of isobutylvinylether, whereas by operating in the presence of aluminium trichloride under the same conditions, polymers which are completely or almost completely amorphous by X-ray examination are obtained.

Moreover, it should be noted that the use by itself of a solid crystalline halides of transition metals belonging to the 4th or 5th group of the Periodic Table, in which the metal has a valence lower than the highest one (provided that the metal base does not contain traces of high valence halides) does not promote the polymerization of vinyl ethers.

An object of the present invention is to provide a normal process for the stereospecific polymerization of vinyl ethers. Another object is to obtain an improved stereospecific vinyl ether polymer. Additional objects will become apparent hereinafter.

We have surprisingly found that an improved process for the stereospecific polymerization of vinyl ethers of the general formula

wherein R is an alkyl radical containing up to 5 carbon atoms results, provided that the polymerization is carried out in the presence of a cationic catalyst comprising solid solutions of $AlCl_3$ with $MeCl_3$, in which Me is a transition metal belonging to the 4th or 5th group of the Periodic Table and is preferably titanium or vanadium.

According to our process, suitable catalysts can be obtained by reduction of $TiCl_4$ with metallic aluminium, either in the presence or absence of aluminium trichloride.

The aluminium trichloride content of the aforementioned solid solutions may vary within a rather wide range. Desirably, the weight ratio of aluminium to $MeCl_3$ plus $AlCl_3$ is from about 2% to 10% by weight. A more preferred weight ratio of $Al(MeCl_3+AlCl_3)$ is from about 3% to 5% by weight.

The aluminium trichloride content in the solid solutions can be varied as desired by subjecting the mixed crystals to any treatment capable of removing or modifying, wholly or in part, aluminium trichloride. This result can be attained, e.g., by sublimation under reduced pressure.

It may be particularly desirable to carry out a removal of a portion of the aluminium chloride present by treatment with solvents capable of forming complexes with aluminium trichloride, e.g., ethers or tetrahydrofurane. The removal of $AlCl_3$ present in the solid solutions creates some voids in the lattice which lead to surface irregularities.

Particularly active catalysts can also be obtained by treating the solid solutions of $AlCl_3$-$TiCl_3$ or $AlCl_3$-$VCl_3$ with organo-metallic aluminium compound solutions before commencing the polymerization. In such instances, before carrying out the polymerization it is desirable to remove, e.g., by filtration, the hydrocarbon solution containing the organometallic aluminium compounds. It can be assumed that this treatment with an organometallic aluminium compound can cause, at least on the surface, a dissolving or an alkylation of aluminium trichloride present in the solid solutions.

According to our process, the polymerization of vinyl ethers can be carried out at temperatures from about $-30°$ C. to $-120°$ C., and preferably from about $-50°$ C. to $-80°$ C.

The polymerization can be carried out in the presence or absence of one or more organic compounds which are liquid under the particular reaction conditions and function as a solvent for the monomer. Solvents that can be employed include toluene, mixtures of toluene with aliphatic hydrocarbons and/or with an ether. If an ether is used it is preferable that it have a basicity lower than that of the monomer to be polymerized (the basicity being as defined by Zervis).

For instance, in the polymerization of isobutyl-vinyl-ether in the presence of catalysts of the type $MeCl_3$-$AlCl_3$, it is convenient to carry out the polymerization in the presence of a small amount of anisole.

The following examples will further illustrate our invention without limiting its scope. All parts are by weight, unless otherwise stated.

*Example 1*

150 cc. of pure anhydrous toluene and 400 mg. of $TiCl_3$ cocrystallized with $AlCl_3$ are introduced under nitrogen into a three-necked 250-cc. flask provided with a dropping funnel and a pipe for introducing nitrogen. The $AlCl_3$ content of this catalyst is 21.70%. The mixture is then cooled to $-78°$ C. and, while continuously agitating the mixture, 15 g. (150 millimoles) of vinyl isobutyl ether (purified by distillation on metallic sodium and lithium aluminium hydride) are slowly added over a two-hour period. After addition of all of the monomer, the agitation is continued at $-78°$ C. for about four hours. The viscosity of the solution increases remarkably and a portion of the polymer precipitates in the form of gel.

The reaction is stopped by adding 30 cc. of n-butanol. The solution is diluted in order to completely dissolve all of the polymer formed and is then filtered and poured slowly, while agitating, into an amount of methanol having a volume five times that of the solution.

The precipitated polymer is collected on a filter, thoroughly washed with methanol, and finally dried at about 75° C. under reduced pressure.

12.3 g. (corresponding to 82% of the monomer) of polyvinyl-isobutyl ether are thus obtained. The polymer is in the form of a non-tacky white solid, having an intrinsic viscosity, as determined in toluene at 30° C., of 2.67. It presents an X-ray diffraction spectrum, registered with a Geiger counter, which is characteristic of crystalline polymers and is similar to that described for polyisobutyl-vinylether in Italian Patent Number 597,550.

The polymer is soluble in various organic solvents such as hyrocarbons, halogenated hydrocarbons, esters and ethers. In contrast, it is insoluble in methanol, ethanol, and acetone. It can be extruded into filaments that can be oriented by stretching, or it can be molded at 110° C. to 140° C. into very transparent laminae or film.

*Example 2*

The polymerization of vinyl isobutyl ether is carried out as described in Example 1 by subjecting the solid solution of TiCl$_3$ and AlCl$_3$ to the following pre-treatment: 500 g. of this solid solution (containing 21.7% of AlCl$_3$) are suspended in 50 cc. of toluene containing 0.28 cc. (2.5 millimoles) of AlCl$_2$(C$_2$H$_5$), the whole being blanketed with nitrogen. The mixture is heated to 50° C. for one hour and, after cooling, the soluble portion is separated and discarded, and the insoluble remainder is washed repeatedly with toluene. After this pre-treatment the polymerization is carried out as described in Example 1.

12.8 g. (corresponding to 85% of the monomer) of a crystalline polyvinylisobutyl ether are obtained. This polymer has properties similar to those of the polymer described in Example 1. The polymer has an intrinsic viscosity, as determined in toluene at 30° C., of 0.46.

*Example 3*

The polymerization of vinyl isobutyl ether is carried out as described in Example 1, but the solid solution of TiCl$_3$ and AlCl$_3$ is subjected to the following pre-treatment: 500 mg. of the TiCl$_3$-AlCl$_3$ solid solution (containing 21.7% of AlCl$_3$) are suspended in 20 cc. of anhydrous toluene and 2 cc. of anhydrous diethyl ether under nitrogen. This mixture is heated to 70° C. for three hours and, after cooling, 130 cc. of toluene are additionally added. To this catalytic mixture, which is carefully agitated and cooled to −78° C., the monomer is added under the same conditions as described in Example 1. 14.0 g. (corresponding to 46% of the monomer) of polyvinyl isobutylether, a non-tacky, white, flocky solid, are obtained.

The polymer has an intrinsic viscosity, as determined in toluene at 30° C., of 0.73.

*Example 4*

The polymerization of vinylisobutyl ether is carried out as described in Example 1; however, 0.18 cc. of anhydrous anisole is added to the catalytic mixture before adding the monomer. By proceeding as described in Example 1, 6.9 g. (corresponding to 46% of the monomer) of a polyvinyl isobutyl ether are obtained. The polymer is a crystalline solid having a white, compact appearance and properties similar to those of the sample described in Example 1. It has an intrinsic viscosity, as determined in toluene at 30° C., of 1.23.

*Example 5*

The polymerization of vinyl isobutyl ether is carried out as described in Example 1; however, the polymerization catalyst, a solid solution of TiCl$_3$-AlCl$_3$, is pretreated as follows: the solid solution (containing 21.7% AlCl$_3$) is extracted for 18 hours in a Soxhlet extractor with anhydrous diethyl ether, the whole being blanketed with nitrogen throughout. The extraction residue is then dried under reduced pressure.

Proceeding as described in Example 1 (i.e., using 500 mg. of said solid solution after extraction with ether), 13.5 g. (corresponding to 90% of the monomer) of a crystalline white, fibrous polyvinylisobutyl ether are obtained. This polymer has better characteristics than those of the polymers obtained in the preceding examples, and it exhibits a high degree of crystallinity. It presents an intrinsic viscosity, as determined in toluene at 30° C., of 1.4.

*Examples*

The polymerization of vinyl isobutylether is carried out at −78° C. with 300 mg. of the same catalyst as used in Example 5. A 600-cc. polymerization vessel is used. The solvent is a mixture of 250 cc. of anhydrous toluene and 100 g. of liquefied pure toluene. The monomer (25 g.) is added to the catalytic mixture, while agitating over a period of about five hours. After addition of the monomer the mixture is maintained at −78° C. for an additional 16 hours.

By proceeding as described in Example 1, 20.2 g. (corresponding to 81% of the monomer) of a crystalline, white, fibrous polyvinylisobutyl ether are obtained. The polymer has good mechanical characteristics and a high degree of crystallinity. It presents an intrinsic viscosity, as determined in toluene at 30° C., of 0.73.

Variations can of course be made without departing from the spirit of our invention.

Having thus described our invention, what we desire to secure and claim by Letters Patent is:

1. A process for the stereospecific polymerization of a vinyl ether of the general formula $$CH_2=CH-O-R$$

in which R is an alkyl radical consisting of carrying out the polymerization in contact with cationic catalysts consisting essentially of solid solutions of aluminum trichloride and a chloride having the formula MeCl$_3$, in which Me is selected from the group consisting of titanium and vanadium.

2. The process of claim 1, wherein R is an alkyl radical containing from 1 to 5 carbon atoms.

3. The process of claim 1 wherein the ether is vinyl isobutyl ether.

4. A process for the stereospecific polymerization of a vinyl ether of the general formula $$CH_2=CH-O-R$$

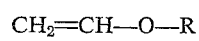

in which R is an alkyl radical consisting of carrying out the polymerization in contact with cationic catalysts consisting essentially of solid solutions of aluminum trichloride and a chloride having the formula MeCl$_3$, in which Me is selected from the group consisting of titanium and vanadium and is obtained by reducing MeCl$_4$ with metallic Al in the presence of aluminum trichloride.

5. The process of claim 4 wherein the weight ratio of Al to MeCl$_3$ plus AlCl$_3$ in the catalyst is from 2% to 10%.

6. The process of claim 5 wherein the said weight ratio is from 3% to 5%.

7. The process of claim 1 wherein Me is titanium.

8. The process of claim 1 wherein Me is vanadium.

9. A process consisting of polymerizing, in the presence of solid solutions consisting essentially of aluminum trichloride and a chloride of the formula MeCl$_3$ wherein Me is selected from the group consisting of titanium and vanadium, a vinyl ether of the general formula $$CH_2=CH-O-R$$

in which R is an alkyl radical containing up to 5 carbon atoms.

10. The process of claim 9 wherein Me is titanium.

11. The process of claim 9 wherein Me is vanadium.

(References on following page)

References Cited by the Examiner

UNITED STATES PATENTS

| | | | |
|---|---|---|---|
| 2,542,610 | 2/1951 | Young | 260—91.1 |
| 2,996,459 | 8/1961 | Andersen et al. | 260—91.1 |
| 3,001,951 | 9/1961 | Tornqvist | 252—429 |
| 3,023,198 | 2/1962 | Nowlin | 260—91.1 |
| 3,133,906 | 5/1964 | Natta et al. | 260—91.1 |

FOREIGN PATENTS

| | | |
|---|---|---|
| 820,965 | 9/1959 | Great Britain. |
| 564,727 | 6/1957 | Italy. |

JOSEPH L. SCHOFER, *Primary Examiner.*

HAROLD N. BURSTEIN, *Examiner.*

W. G. GOODSON, M. B. KURTZMAN,
*Assistant Examiners.*

UNITED STATES PATENT OFFICE
CERTIFICATE OF CORRECTION

Patent No. 3,297,671 January 10, 1967

Giulio Natta et al.

It is hereby certified that error appears in the above numbered patent requiring correction and that the said Letters Patent should read as corrected below.

In the heading to the printed specification, line 9, for "Aug. 3, 1960" read -- Aug. 2, 1960 --.

Signed and sealed this 8th day of April 1969.

(SEAL)
Attest:

Edward M. Fletcher, Jr.
Attesting Officer

EDWARD J. BRENNER
Commissioner of Patents